US012597332B2

(12) United States Patent
Malaver et al.

(10) Patent No.: US 12,597,332 B2
(45) Date of Patent: Apr. 7, 2026

(54) CLOUD-BASED MACHINE HEALTH MONITORING

(71) Applicant: Analog Devices Global Unlimited Company, Hamilton (BM)

(72) Inventors: Lewis Malaver, Weston, MA (US); David Redmond, Cork (IE)

(73) Assignee: Analog Devices International Unlimited Company, Limerick (IE)

( * ) Notice: Subject to any disclaimer, the term of this patent is extended or adjusted under 35 U.S.C. 154(b) by 1034 days.

(21) Appl. No.: 16/660,195

(22) Filed: Oct. 22, 2019

(65) Prior Publication Data

US 2020/0051419 A1 Feb. 13, 2020

Related U.S. Application Data

(60) Provisional application No. 62/751,251, filed on Oct. 26, 2018.

(51) Int. Cl.
| | |
|---|---|
| *G08B 21/08* | (2006.01) |
| *G05B 23/02* | (2006.01) |
| *G06F 3/0484* | (2022.01) |
| *G08B 21/18* | (2006.01) |
| *H04L 67/10* | (2022.01) |
| *H04L 67/12* | (2022.01) |
| *H04W 84/18* | (2009.01) |

(52) U.S. Cl.
CPC ....... *G08B 21/187* (2013.01); *G05B 23/0243* (2013.01); *G05B 23/0267* (2013.01); *G06F 3/0484* (2013.01); *H04L 67/10* (2013.01); *H04W 84/18* (2013.01)

(58) Field of Classification Search
CPC .............. G08B 21/187; G05B 23/0243; G05B 23/0267; G06F 3/0484; H04L 67/10; H04L 67/025; H04L 67/12; H04L 67/22; H04L 67/28; H04L 69/40; H04W 84/18
See application file for complete search history.

(56) References Cited

U.S. PATENT DOCUMENTS

| | | | |
|---|---|---|---|
| 5,602,757 A | 2/1997 | Haseley et al. |
| 7,075,327 B2 | 7/2006 | Dimino et al. |
| 7,133,801 B2 | 11/2006 | Song |

(Continued)

OTHER PUBLICATIONS

"Wikipedia—Fault detection and isolation", [Online]. Retrieved from the internet:<URL:https://en.wikipedia.org/wiki/Fault_detection_and_isolation>, (Accessed Jun. 28, 2018), 5 pages.

*Primary Examiner* — Shirley X Zhang

(74) *Attorney, Agent, or Firm* — Schwegman Lundberg & Woessner, P.A.

(57) ABSTRACT

Systems and methods for detecting, isolating, and diagnosing machine faults are discussed. An exemplary system includes a network of sensor nodes deployed at machines or machine components to sense information of machine characteristics, and to generate physical or statistical features using the sensed machine characteristics. A cloud-computing device, communicatively coupled to the sensor network, can provide cloud-based services including detecting a machine fault, diagnosing a fault type, or estimating time to machine failure. A user interface associated with a client device can alert a user of the detected fault, such that the user can take preventive actions to minimize machine downtime.

20 Claims, 10 Drawing Sheets

(56)                   References Cited

U.S. PATENT DOCUMENTS

| | | | |
|---|---|---|---|
| 2005/0171736 A1 | 8/2005 | Kang | |
| 2015/0332463 A1* | 11/2015 | Galera | G06V 40/103 |
| | | | 382/103 |
| 2016/0182309 A1* | 6/2016 | Maturana | G06F 30/20 |
| | | | 709/224 |
| 2016/0284073 A1* | 9/2016 | Michalscheck | G05B 23/0216 |
| 2017/0220985 A1* | 8/2017 | White | H04L 67/2833 |
| 2017/0357250 A1* | 12/2017 | Sandler | G06Q 10/00 |
| 2021/0183227 A1* | 6/2021 | Kovscek | G01F 1/666 |

\* cited by examiner

700

710   DEPLOY EDGE NODES

720   SENSE INFORMATION OF MACHINE CHARACTERISTICS

730   EXTRACT FEATURES AT EDGE NODES

740   GENERATE CLOUD-BASED ANALYTICS

750   PROVIDE ANALYTICS TO A USER AND ALERT FOR ANOMALY

CLOUD-BASED MACHINE HEALTH MONITORING

CLAIM OF PRIORITY

This application claims the benefit of priority of U.S. Non-Provisional Patent Application No. 62/751,251, filed Oct. 26, 2018, which is hereby incorporated by references herein in its entirety.

TECHNICAL FIELD

This document relates generally to machine condition monitoring, and more particularly to a diagnostic system for detecting and analyzing faults of a machine.

BACKGROUND

Manufacturing and processing facilities and plants usually contain many machines for various applications. These machines generally have complex mechanical components of all sizes and shapes. In some facilities, hundreds or even thousands of machines may exist in connection with various processes being performed to meet the manufacturing and processing requirements.

Many machines, such as compressors, turbines, pumps, motors, and fans, include rotational components. In order to maintain, troubleshoot and operate these machines, it is often important to monitor the machines during operation and detect any potential component defects or operational faults. Rotation speed, or rotations per minute (RPM) readings, can be used to assess operations of some rotational components of a machine. Some problems with the machines that are not readily apparent to the naked eyes or are otherwise difficult or impossible to ascertain can be identified by analyzing the RPM readings. For example, significant deviations of RPM readings from some specified machine specification, or away from past RPM readings, can be indicative of machine anomaly that requires maintenance, repair, or replacement of a machine part.

Accurate characterization of a health condition of a machine or a machine part is important for detecting a machine fault and generating fault diagnostics. Improper or inaccurate characterization (e.g., RPM readings) can lead to false detection or misdiagnosis of a fault. Conventional machine fault detection generally requires a human operator to perform machine fault testing intermittently, such as during scheduled maintenance. The engineer may use a portable instrument to perform an RPM test, interpret the results, and decide presence or absence of machine faults, and recognizes particular fault types.

SUMMARY

Sensors have been used to monitor machine health and to detect anomalies. Characteristic features, such as rotational speed (or RPM readings) for rotating machine parts, may be extracted from sensor signals. For example, an RPM sensor, commonly known as a tachometer, can be installed on a machine to measure the rotational speed directly. Installation of such sensors, however, can be difficult because some machine parts to be monitored are not easily accessible. Moreover, the RPM sensors can be costly. Given the large numbers of machines in typical plants, the overall cost for machine health condition monitoring based on such RPM sensors can be prohibitive. Consequently, direct RPM measurement is often limited to a few critical machines or machine parts.

The present document discusses cloud-based systems, devices, and methods for detecting, isolating, and diagnosing machine faults, such as anomalies associated with a motor, a gearbox, a bearing, a transmission, or other components. An exemplary system may include a network of sensor nodes deployed at machines or machine parts to sense machine characteristics from the respective machine components, which in some examples may include one or more of vibration, energy profiles, magnetic field, temperature, or acoustic information produced by the rotational movement of machine components. Physical or statistical features may be generated using the machine characteristics. A computing device, such as a cloud server, may communicate with the sensor nodes, and provide cloud-based services, including detecting a fault of the machine being monitored using the machine characteristics produced by the sensor nodes, and diagnosing a fault type associated with one or more components of the machine. A user interface, which can be associated with a personal computer (PC) or a mobile device (e.g., a tablet or a mobile phone), can alert a user about incipient fault and fault diagnostics. The user may take actions such as further inspection, services, and repairs to prevent machine or part failure and minimize machine downtime.

Example 1 is a system for monitoring machine health condition. The system comprises a sensor network, a cloud-computing device, and a user interface. The sensor nodes can be configured to sense information of machine characteristics respectively from a plurality of machine parts, and to generate one or more features using the sensed information of machine characteristics. The cloud-computing device can be communicatively coupled to the sensor network and configured to provide cloud-based services including detecting an existence of a fault or diagnosing a fault type associated with the machine parts using the generated one or more features. The user interface can be configured to alert a user of the detected fault or the diagnosed fault type.

In Example 2, the subject matter of Example 1 optionally includes the cloud-based services that further include generating a machine operational state model, and deploying the generated machine operational state model to the sensor nodes. The sensor nodes can be each configured to determine whether the respective machine parts are in an ON state or an OFF state using the deployed machine operational state model, and generate and transmit the one or more features to the cloud-computing device only if the respective machine parts are determined to be in an ON state.

In Example 3, the subject matter of any one or more of Examples 1-2 optionally includes at least one of the sensor nodes that can be configured to perform a Fourier transform of the sensed machine characteristics, and generate one or more spectral features using the Fourier transformed machine characteristics.

In Example 4, the subject matter of any one or more of Examples 1-3 optionally includes at least one of the sensor nodes that can be configured to estimate an operating speed of a machine part using the sensed information of machine characteristics.

In Example 5, the subject matter of any one or more of Examples 1-4 optionally includes the cloud-computing device that can be configured to detect the existence of the fault using one or more spectral features.

In Example 6, the subject matter of any one or more of Examples 1-5 optionally includes the cloud-based services that can include generating an indicator of time to machine failure using the generated one or more features. The user interface can be configured to alert the user of the time to a machine failure.

In Example 7, the subject matter of any one or more of Examples 1-6 optionally includes the cloud-computing device that can be configured to diagnose the fault type using one or more fault templates each including a temporal, spectral, or statistical characteristic of a corresponding machine fault.

In Example 8, the subject matter of any one or more of Examples 1-7 optionally includes the sensor nodes that can include accelerometers configured to sense vibration information respectively from the plurality of machine parts.

In Example 9, the subject matter of any one or more of Examples 1-8 optionally includes the sensor nodes that can include magnetic sensors configured to sense the magnetic field information respectively produced by the plurality of machine parts.

In Example 10, the subject matter of any one or more of Examples 1-9 optionally includes the sensor nodes that can include temperature sensors configured to sense temperature information respectively from the plurality of machine parts.

In Example 11, the subject matter of any one or more of Examples 1-10 optionally includes the sensor nodes that can include acoustic sensors configured to sense acoustic information respectively from the plurality of machine parts.

In Example 12, the subject matter of any one or more of Examples 1-11 optionally includes the sensor network that can be a wireless sensor network.

In Example 13, the subject matter of any one or more of Examples 1-12 optionally includes the sensor nodes that can be configured to be affixed to the respective machine parts using a non-invasive mounting means.

In Example 14, the subject matter of Example 13 optionally includes the non-invasive mounting means that can include a magnet.

In Example 15, the subject matter of any one or more of Examples 1-14 optionally includes a client device associated with the user interface. The client device can be configured to communicate with the cloud-computing device to access one or more of the cloud-based services, and display on the user interface an interactive dashboard including the detected fault or the diagnosed fault type.

In Example 16, the subject matter of Example 15 optionally includes the client device that can include a mobile device.

Example 17 is a method for monitoring machine health condition. The method comprises steps of: deploying networked sensor nodes respectively to a plurality of machine parts; sensing information of machine characteristics of the plurality of machine parts using the deployed sensor nodes; generating one or more features using the sensed information of machine characteristics; generating cloud-based analytics, including detecting an existence of a fault or diagnosing a fault type associated with the machine parts using the generated one or more features; and alerting a user of the detected fault or the diagnosed fault type.

In Example 18, the subject matter of Example 17 optionally includes the cloud-based services that can include include: generating a machine operational state model; deploying the generated machine operational state model to the networked sensor nodes; determining whether the respective machine parts are in an ON state or an OFF state using the deployed machine operational state model; and generating and transmitting the one or more features to the cloud-computing device only if the respective machine parts are determined to be in an ON state.

In Example 19, the subject matter of any one or more of Examples 17-18 optionally includes generating the cloud-based analytics that can include generating an indicator of time to a machine failure using the generated one or more features. The method further comprises alerting the user of the time to a machine failure.

In Example 20, the subject matter of any one or more of Examples 17-19 optionally includes detecting the existence of the fault using one or more spectral features.

In Example 21, the subject matter of any one or more of Examples 17-20 optionally includes diagnosing the fault type using one or more fault templates each including temporal, spectral, or statistical characteristics of a corresponding machine fault.

In Example 22, the subject matter of any one or more of Examples 17-21 optionally includes sensing the information of machine characteristics that can include sensing vibration information respectively from the plurality of machine parts using accelerometers.

In Example 23, the subject matter of any one or more of Examples 17-22 optionally includes sensing the information of machine characteristics that can include sensing magnetic field information respectively from the plurality of machine parts using magnetic sensors.

In Example 24, the subject matter of any one or more of Examples 17-23 optionally includes sensing the information of machine characteristics that can include sensing temperature information respectively from the plurality of machine parts using temperature sensors.

In Example 25, the subject matter of any one or more of Examples 17-24 optionally includes sensing the information of machine characteristics that can include sensing acoustic information respectively from the plurality of machine parts using acoustic sensors.

In Example 26, the subject matter of any one or more of Examples 17-25 optionally includes steps of accessing one or more of the cloud-based services using a client device, and displaying on a user interface an interactive dashboard including the detected fault or the diagnosed fault.

This Overview is an overview of some of the teachings of the present application and not intended to be an exclusive or exhaustive treatment of the present subject matter. Further details about the present subject matter are found in the detailed description and appended claims. Other aspects of the disclosure will be apparent to persons skilled in the art upon reading and understanding the following detailed description and viewing the drawings that form a part thereof, each of which are not to be taken in a limiting sense. The scope of the present disclosure is defined by the appended claims and their legal equivalents.

BRIEF DESCRIPTION OF THE DRAWINGS

Various embodiments are illustrated by way of example in the figures of the accompanying drawings. Such embodiments are demonstrative and not intended to be exhaustive or exclusive embodiments of the present subject matter.

DETAILED DESCRIPTION

Figure 1:
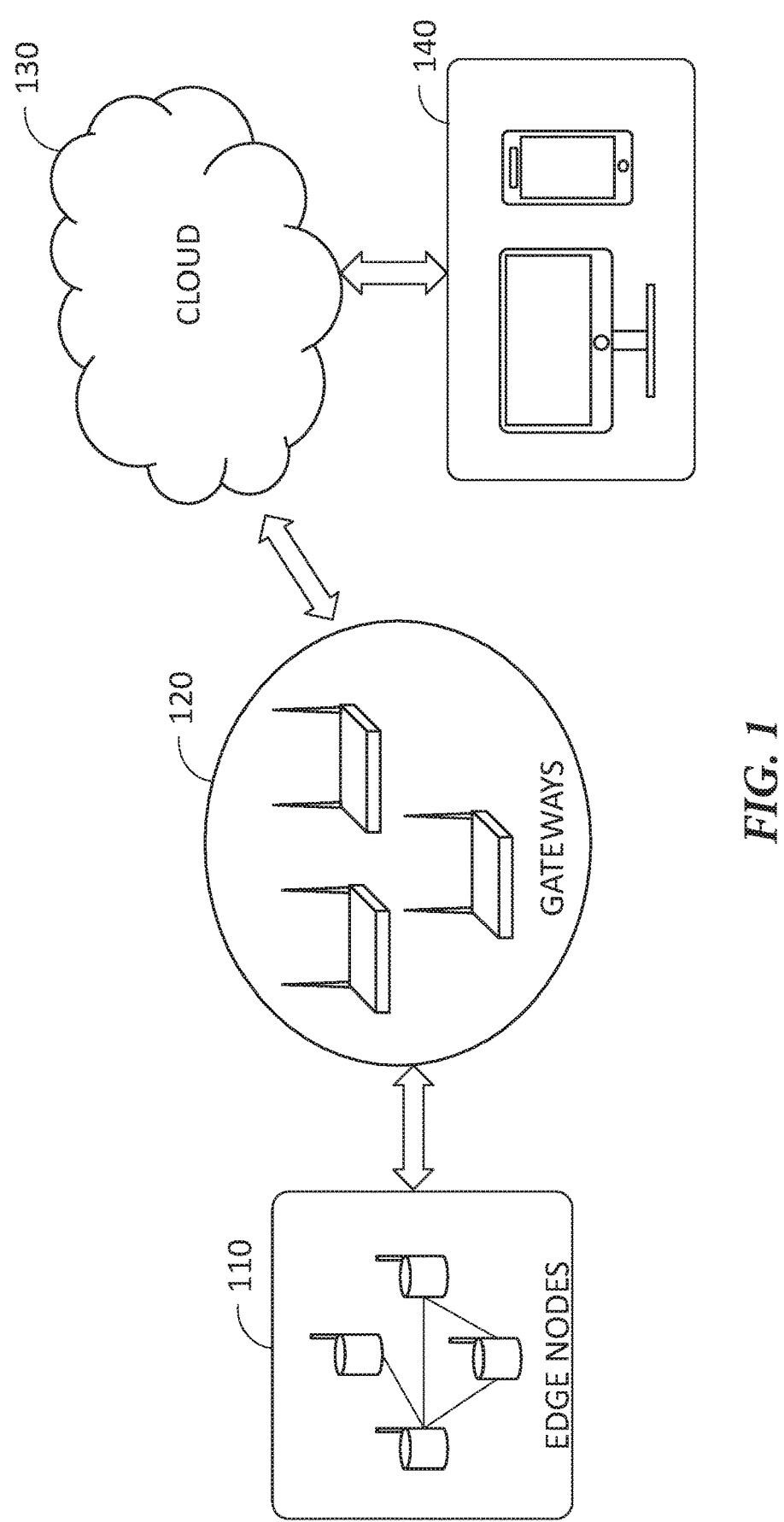
FIG. 1 is a diagram illustrating an exemplary architecture of a machine health monitoring system to detect, isolate, and diagnose machine anomaly.

Rotational speed may be estimated indirectly using information of machine characteristics, such as vibration, energy profiles, magnetic field, temperature, or acoustic information produced by the rotational movement of some machine parts. The estimate RPM can then be used detect if machine faults are present. For example, most machines have a typical vibration level and a frequency spectrum with a characteristic shape when the machine is in a good operating condition. If a machine fault develops, the dynamic processes in the machine may change, so do the forces acting on the machine. This may result in corresponding changes in vibration level and vibration spectrum. For example, excessive vibration levels at certain frequencies may indicate a particular machine fault or operational problem. The defect frequencies are directly related to the machine speed as multiples of RPM. By monitoring the change in the vibration level and spectrum, a trained operator can determine if a machine fault is present, and if so, the type of fault most likely to have been involved. However, indirect RPM measurement methods typically requires an operator to interpret the vibration spectrum, which may not be suitable for automatic machine fault detection and diagnosis.

In addition to the lack of automaticity, conventional machine health monitoring approaches also do not support continuous monitoring when the machine is operating in its normal environment. The present inventors have recognized an unmet need for automated, continuous and coordinated machine health monitoring particularly in view of the advances in information technology and new device capabilities.

Disclosed herein are systems, devices, and methods for detecting, isolating, and diagnosing machine faults. An exemplary system includes a network of sensor nodes deployed at machines or machine components to sense machine characteristics from the respective machine components, which in some examples may include one or more of vibration, energy profiles, magnetic field, temperature, or acoustic information produced by the rotational movement of machine components. The system may generate physical or statistical features using the sensed machine characteristics. A computing device, communicatively coupled to the sensor network, can provide cloud-based services including detecting a machine fault, diagnosing a fault type, and/or generating an indicator of how long before the detected fault may cause a machine failure. A user interface, associated with PC or a mobile device, can present to a user the underlying machine health status, and generate an alert of the incipient fault and fault type. Preventive actions may be taken to minimize machine downtime.

The cloud-based machine fault detection and diagnosis discussed herein may improve the technology of automated and continuous machine health monitoring. Compared to the conventional techniques as discussed above, the present approach has several advantages. First, in contrast to the conventional time-based monitoring wherein machines are tested at particular time intervals, the systems and methods discussed herein utilize condition-based monitoring (CBM) in which the testing and anomaly resolution can occur only upon detection of a problem or a suspected problem. As such, the number of unnecessary machine servicing and testing sessions and shutdowns and their associated costs can be substantially reduced. Costly machine breakdowns can be reduced or even eliminated in some cases due to the ability to detect faults earlier before they can do much damage. Second, the cloud-based machine health monitoring can help improve on-line and coordinated fault analysis using relatively low-cost data acquisition systems and sensors. Compared to conventional hand-held or other portable measurement and detection solutions, the present systems and methods provide the operators with a means for continuous, remote monitoring of machine condition when the machine is operating in its normal environment. The on-line and coordinated fault analysis may also help increase load on the machine for increased throughput without increasing the likelihood of machine fault. Third, the cloud-based machine health monitoring can also improve the data management, security, and flexibility. Continuous monitoring and acquisition of machine characteristic data may subject the machine operators and service personnel to data overload.

An exemplary cloud computing architecture as discussed in this document may provide cloud services of data storage and fault analytics including fault detection and diagnosis, while sensor nodes perform data collection, pre-processing, and feature extraction. The cloud-based fault analysis and data management may reduce an operator's workload of onsite machine monitoring and testing, and allows the operator to focus on situations requiring immediate attention. In contrast to conventional local data storage and computing, with cloud computing, there is virtually no need for a user or a facility to maintain their own physical servers, while having the capability to access all required information and computing resources in the cloud via an Internet connection. The user may have vast scalability by using cloud servers for storage, and use only the storage space they require. As discussed in this document, a user can use a client device to access machine analytics, among other information produced and/or stored in the cloud, remotely from anywhere or on-the-move provided there is Internet access. Additionally, multiple users of the cloud service can work on the same piece of information at the same time from their respective clients securely connected to the cloud (e.g., PCs or mobile devices), thus enabling easier collaboration.

FIG. 1 is a diagram illustrating an exemplary architecture of a machine health monitoring system 100 that can be configured to detect, isolate, and diagnose machine anomaly. The anomaly may be associated with various machine components, such motors, gears, bearings, transmission, or other components. The system 100 may include one or more of a network of edge nodes 110, gateways 120, a computing device 130 configured to provide cloud-based services, and a user interface 140.

The edge nodes 110 may be deployed on machines or machine parts, and configured to acquire information of machine characteristics such as vibration, energy profiles, magnetic field, temperature, or acoustic information produced by the rotational movement of machine components. The edge nodes 110 may be programmed to monitor machine characteristics continuously when the machine operates in its normal environment (e.g., a normal operating condition, as opposed to a testing mode distinct from the normal operating condition). The edge nodes 110 may be mounted on a machine or a machine part using treaded mounting, or a non-invasive means that does not cause permanent alteration to the part of the machine in contact with the edge node. Examples of the non-invasive mounts may include magnet, epoxy, or other adhesives. In an example, at least some of the edge nodes 110 each include an accelerometer that can provide continuous monitoring of the machine condition. In an example, the accelerometer may be a high-bandwidth, single-axis or multi-axis (e.g., two- or three-axis) accelerometer capable of sensing machine vibration in high fidelity. The edge nodes 110 may be battery-powered, which provide long lifetime of operation and low maintenance cost. In an example, the battery can be a re-chargeable battery. In an example, the edge nodes 110 may include an energy-harvesting module to capture energy from external sources (e.g., machine rotations or other kinetic energy), convert and store the energy to operate the edge nodes 110. Examples of physical configuration of an edge node is discussed below, with reference to FIGS. 2A-2B.

The edge nodes 110 may process the information of machine characteristics to generate machine operational parameters. Examples of the machine operational parameters may include one or more of rotating speed estimate (e.g., RPM), statistical or physical features (e.g., temporal or spectral features), summary statistics, machine health indicators, and diagnostic features indicative of various types of faults.

Although the discussion of fault detection and fault diagnostics in the present document focuses on machine vibration information, this is meant only by way of example and not limitation. It is within the contemplation of the inventors and within the scope of this document, that the systems, devices, and methods discussed herein for machine health monitoring and diagnostics may alternatively or additionally be carried out using other machine characteristics, such as one or more of magnetic field, temperature, or acoustic information, produced by the rotational movement of machine components. In some examples, in addition to the vibration or other machine characteristics, the edge nodes may include sensor modalities configured to sense one or more physical parameters in connection with the operation of a machine or machine part, and/or environmental parameters. Examples of such parameters may include position, speed, acceleration, or other motion descriptors; electrical parameters such as voltage, current, and impedance; stress, strain, and shock associated with a machine or a part thereof; ambient environmental parameters such as temperature, pressure, and humidity, among others.

In some examples, the edge nodes 110 may additionally generate indicators of operational state, such as an ON/OFF state, of a machine or a machine part. The edge nodes 10 may detect the ON/OFF state of a machine or a machine part using the information of machine characteristics, such as vibration, energy profiles, magnetic field, temperature, or acoustic information of one or more machine parts. In an example, the detection of ON/OFF state may involve an ON/OFF model produced by the cloud 130. If the machined or machine part is determined to be in an "ON" state, then the edge node associated with that machine or machine part may perform feature extraction, RPM estimates, among other node-level analysis using the sensed information of machine characteristics (e.g., vibration information). Examples of feature extraction and other node-level processing functionalities are discussed below, such as with reference to FIG. 3.

The edge nodes 110 may have egress, via a wireless communication network, to the gateways 120 and cloud 130. As illustrated in FIG. 1, the edge nodes 110 may be inter-communicated to form a wireless sensor network, such as a Mesh network. The edge nodes 110 may include self-forming multi-hop mesh of nodes, known as "Motes", which connect directly and dynamically to other nodes and cooperate with one another to efficiently collect and route data front/to clients. Such a mesh network can dynamically self-organize and self-configure, which can reduce installation overhead. A network manager can monitor and manage network performance and security, and exchanges data with a host application. Once the edge nodes have joined the mesh network, they can maintain synchronization through time corrections. In an example, the sensor network may include approximately 10-20 edge notes. The number of edge nodes may be updated dynamically, such as when an edge node is activated or deactivated for sensing information of machine characteristics. In some examples, the edge nodes may be inter-communicated using radio-frequency telemetry link or a Bluetooth wireless link.

The gateways 120 may include computers and/or computer programs configured to perform specific tasks, such as edge node connectivity, data aggregation and integration, over-the-air (OTA) updates of new data, software, or firmware to the edge nodes or other mobile devices, identity recognition, security, data buffering, alerting, gateway analytics, monitoring service connectivity, SOS, among others. In an example, the gateways 120 may have a policy that controls what individual edge nodes can send data to the cloud 130. The gateways 120 can be updated with access policies or whitelists.

The gateways 120 may support one or more data communication protocols to control and monitor data flow from the edge nodes 110 to the cloud 130, such as an Internet protocol via Ethernet or a wireless network (e.g., WiFi, or cellular network). In an example, communication between the gateways 120 and the cloud 130 may follow a Message Queuing Telemetry Transport (MQTT) protocol. The MQTT protocol has lightweight overhead and increased scalability, and can significantly increase the amount of data being monitored or controlled. It therefore can be well suited for connections with remote locations where a small code footprint is required, or where the network bandwidth is limited. In some examples, the gateways 120 can be independent from an existing IT network to improve information security.

As illustrated in FIG. 1, the gateways 120 may include multiple devices, such as multiple routers, that form an asset group. Each router can post data on behalf of an edge node. When an edge node is activated, it can be added to the sensor network. Conversely, an edge node can be removed from the network when it is deactivated.

The cloud 130 may provide data storage, computing services such as machine fault analytics, and provisioning of customer services, among others. The cloud 130 can be updated with access policies or whitelists. The cloud 130 may have a scalable infrastructure that supports the deployed services for sensor data storage and computation. In an example, the cloud 130 may be a part of a cloud platform configured to dynamically assign the physical and virtual resources to the machine health monitoring system 100 according to the system demand, such as number of edge nodes 110, amount of sensor data provided to the cloud, or quality-of-service (QoS) requirements. In some examples, the cloud 130 can be an on-premise cloud.

Data and computing services in the cloud 130 may be accessed such as via Internet. The computing services may include analyzing the statistical or physical features produced by the edge nodes 110, detecting machine anomaly, diagnosing a fault type associated with a machine or a machine part, among other fault analytics services. In some examples, at least a portion of said computing services may be distributed between the cloud 130 and the edge nodes 110. Because the data volume of the extracted features is generally less than the raw sensor data, cloud computing using the extracted features may help conserve bandwidth, save storage space, and therefore achieve cost saving. Examples of machine analytics such as anomaly detection and fault diagnostics are discussed below, such as with reference to FIG. 4.

In some examples, the computing services in the cloud 130 include on-going adaption for improved uptime of the machine being monitored. The machine health monitoring system 100 may use the analytics generated and stored in the cloud 130 to adjust the behavior of one or more of the edge nodes 110. For example, if a machine fault is detected, then the edge node associated with the faulty machine may be adjusted, automatically or with user intervention, such as to acquire additional data at a higher sampling rate or generate additional features to confirm the detected fault.

The user interface 140 may be associated with one or more locally configured clients or remote clients securely connected to the cloud 130 over Internet connection (e.g., Ethernet, or wireless connection such as WiFi or a cellular network). Data communication between the clients and the cloud 130 may follow Transmission Control Protocol/Internet Protocol (TCP/IP), Wi-Fi Protected Access security protocol, 3G or 4G cellular network protocols, Long-Term Evolution (LTE), or other wireless network protocols. As may be appreciated by one skilled in the art, other network topologies and arrangements are possible. Examples of the clients may include PCs, tablets, mobile phones or other mobile devices, among others.

A user may use one of more of said clients to access the cloud 130, such as via the Hypertext Transfer Protocol (HTTP) or an encrypted communication protocol (e.g., Hypertext Transfer Protocol for secure communication (HTTPS)). In an example, a user may query a database of the cloud 130, upon necessary user authentication (e.g., account ID, password, bearer token etc.), for information such as fault diagnostics or prognostics, or system operational status. Software programs or mobile applications ("apps") may present the fault analytics to a user, such as to display on a screen of the user interface. Health information about multiple machines or machine parts in a plant, including fault analytics (e.g., fault detection and classification), may be presented in a form of an interactive dashboard. The information may be presented in a table, a chart, a diagram, or various textual, tabular, or graphical formats. Hard copies of such information may be printed. The information presented to the user may also include edge node deployment, data acquisition and analysis, system connectivity and operating status, etc.

The client devices may generate an alert notification to alert a user of the detected incipient fault, the diagnosed fault type, and/or how long before the fault may cause machine failure. The alert notification may be sent via email, text or "Instant" messaging such as short message service (SMS), Web page update, phone or pager call, among others. In some examples, alert notification is triggered only when a specific alert condition is satisfied. Upon alert notification, the user may view that status, interpret the results, and take actions such as performing further test, make necessary repairs or other preventive or corrective actions.

Portions of the machine health monitoring system 100 may be implemented using hardware, software, firmware, or combinations thereof. In an example, at least a portion of the machine health monitoring system 100 may be implemented using an application-specific circuit that may be constructed or configured to perform one or more particular functions, or may be implemented using a general-purpose circuit that may be programmed or otherwise configured to perform one or more particular functions. Such a general-purpose circuit may include a microprocessor or a portion thereof, a micro-controller or a portion thereof, or a programmable logic circuit, a memory circuit, a network interface, and various components for interconnecting these components. For example, a "comparator" may include, among other things, an electronic circuit comparator that may be constructed to perform the specific function of a comparison between two signals or the comparator may be implemented as a portion of a general-purpose circuit that may be driven by a code instructing a portion of the general-purpose circuit to perform a comparison between the two signals.

Figure 2B:
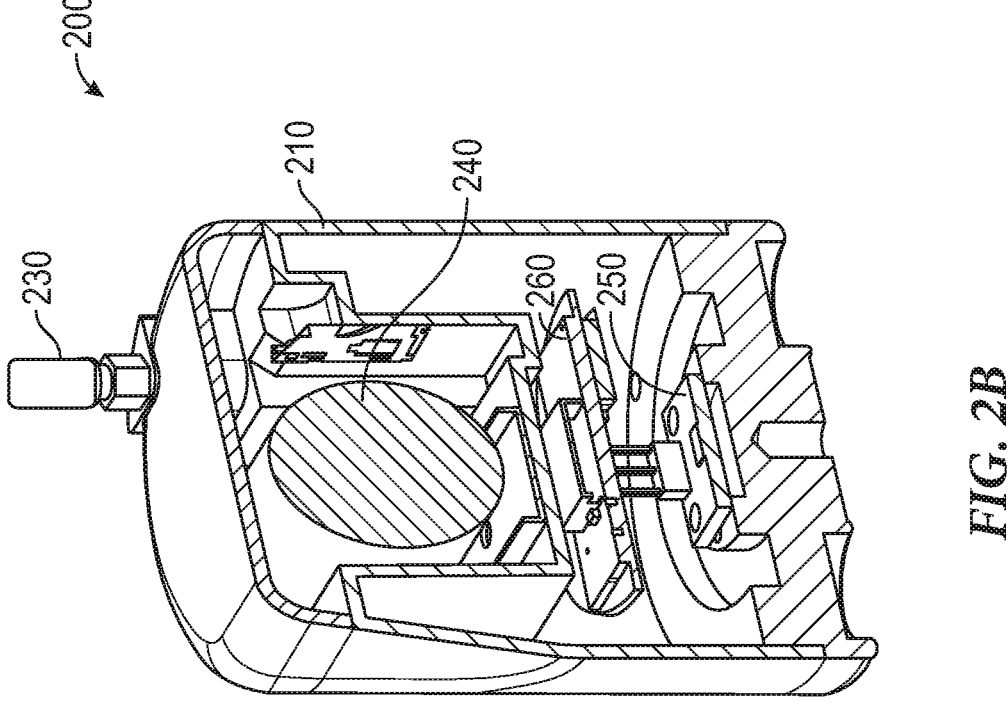
FIGS. 2A-2B illustrate an example of a deployable edge node to sense information of machine characteristics.
Figure 2A:
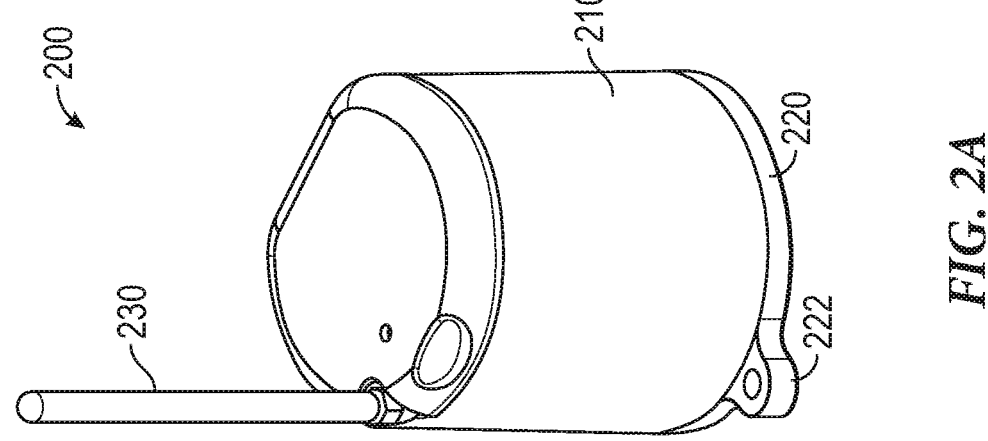

FIGS. 2A-2B are examples of a deployable edge node 200 that can be mounted on a machine to sense machine characteristics, such as one of the edge nodes 110 as discussed above in FIG. 1. The machine characteristics may include one or more of vibration, energy profiles, magnetic field, temperature, or acoustic information produced by the rotational movement of machine components. As illustrated in FIG. 2A, the edge node 200 includes a case 210 enclosing mechanical and electrical parts for sensing information of machine characteristics, a base 220 sized and shaped or otherwise configured to be mounted one a machine or a machine part, and an antenna 230. The case 210 may be made of metal or polymer. In an example, the case 210 may have a water-resistant coating on its outer surface, such that the edge node 200 may function properly when exposed to excessive humidity without compromising the longevity. The base 220 may be made of stainless steel, and include receiving holes 222 for receiving mounting studs to affix the edge node 200 on the machine. In an example, the receiving holes 222 may be threaded. Other mounting or fixation means, including invasive or non-invasive means, may additionally or alternatively be used, such as one or more screws, pins, nails, hooks, barbs, helices, magnets, epoxy, or adhesives. The antenna 230 can help transmit and receive data, such as between the edge node 200 and the gateways 120, using electromagnetic waves of a specified frequency or frequencies. The antenna 230 may transmit and receive electromagnetic waves in ultra-high or super high frequency ranges. In an example, the antenna 230 operates at a frequency of approximately 2.5 GHz.

FIG. 2B is a cutaway view of the edge node 200, which illustrates internal components including a battery 240 situated in a battery compartment, a sensor assembly 250, and a circuit board 260. The sensor assembly 250 can be configured to sense one or more machine characteristics, such as vibration, temperature, magnetic field, or acoustic information produced by a machine during normal operation. The circuit board 260 includes circuits configured to perform data acquisition, processing, storage, and data communication functions, as to be discussed in the following with referenced to FIG. 3. In some examples, the edge node 200 may include memory slots to receive one or more external storage devices, such as SD cards or flash memories, which may be used to store sensor data and other information. The battery 240 and the external memory devices may be arranged inside the case 210 to allow for easy access. In some examples, the edge node 200 may include an indicator of node functionality, such as a light-emitting diode (LED) or other visual indicators.

Figure 3:
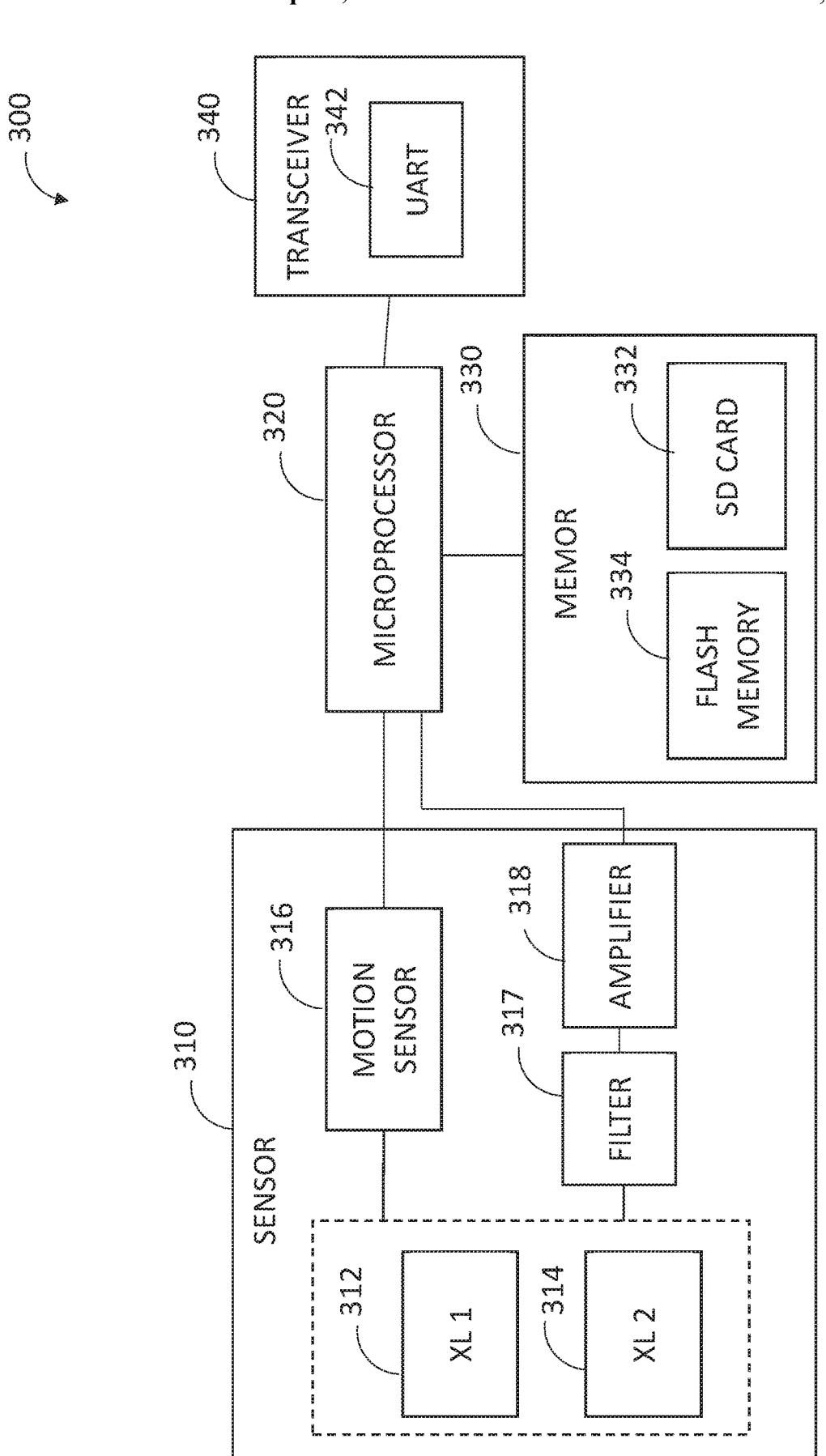
FIG. 3 is a block diagram illustrating an example of functional modules of an edge node.

FIG. 3 is a block diagram illustrating an example of functional modules of an edge node 300, such as the edge node 200 in FIGS. 2A-2B, or one of those edge nodes 110 as illustrated in FIG. 1. In an example, at least some modules illustrated herein may be implemented as a part of a microprocessor circuit. The microprocessor circuit may be a dedicated processor such as a digital signal processor, application specific integrated circuit (ASIC), microprocessor, or other type of processor for processing the information of machine characteristics. Alternatively, the microprocessor circuit may be a processor that may receive and execute a set of instructions of performing the functions, methods, or techniques described herein.

The edge node 300 may include circuit sets comprising one or more circuits or sub-circuits, such as a sensor circuit 310, a microprocessor 320, a memory 330, and a transceiver 340. These circuits may, individually or in combination, perform the functions, methods, or techniques described herein. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

The sensor circuit 310 may sense machine characteristics from various machines or machine parts. In an example, the sensor circuit 310 may include one or more accelerometers configured to sense machine vibration. In the illustrate example, vibration may be sensed using one or more of a three-axis accelerometer 312 or a high-bandwidth accelerometer 314. In another example, the sensor circuit 310 may include one or more magnetic sensors configured to sense the magnetic field produced by machine motion (e.g., vibration) during normal operation. In another example, the sensor circuit 310 may include one or more temperature sensors configured to sense temperature or a change in temperature of the machine being monitored during normal operation. In yet another example, the sensor circuit 310 may include one or more acoustic sensors configured to sense acoustic information produced by the rotational movement of machine components. The acoustic sensors can be sensors based on silicon, optical-waveguide, or polymer technologies. In various examples, the sensor circuit 310 may include adjustable data sampling parameters, such as sampling rate or duty cycle. In an example, the sensor circuit 310 may include a motion sensor 316 configured to qualify the sensor data sampling provided by the accelerometers 312 and/or 314. The motion sensor 316 can be an accelerometer sensor with different performance characteristics than the accelerometers 312 and/or 314. In an example, the motion sensor 316 can be different sensor modality than the accelerometers 312 and/or 314. In an example, the motion sensor 316 may gate data acquisition, such as determining an ON or an OFF state of a machine, and trigger the accelerometers 312 and/or 314 to acquire acceleration data when the machine is in an ON state, consequently conserve battery life.

The edge nodes 110 may pre-process the information of machine characteristics, such as amplification via an amplifier 318, filtering via a filter 317, and other signal conditioning operations. The microprocessor 320 may generate machine operational parameters including, for example, rotating speed estimate (e.g., RPM), statistical or physical features (e.g., temporal or spectral features), summary statistics, machine health indicators, and diagnostic features indicative of various types of faults. Said features or indicators may be extracted or derived from time-domain analysis, frequency-domain or spectral analysis (e.g., via Fast Fourier Transform (FFT)), joint time-frequency analysis, or analysis in other transformed domain, of the acquired sensor information. The statistical features and indicators may include first order, second order, or higher order statistics of the accelerometer data. Examples of statistical features and indicators may include, by way of example and not limitation, absolute max value, average max value, peak-to-peak value, variance, standard deviation, skewness, kurtosis, RMS value, crest factor, clearance factor, impulse factor, shape factor, delta RMS, energy ratio, sideband energy, sideband index, sideband level factor, among others. In some examples, the statistical features or indictors may include one or more composite features computed using two or more of the statistical features of indicators.

In an example, the microprocessor 320 may estimate rotation speed (e.g., RPM) of a rotating machine using the sensor information (e.g., vibration information). From an FFT or power spectrum of the sensor data, spectral peaks may be identified that correspond to the frequencies of target RPM of the machine to be measured and their harmonics (e.g., $1\times$, $2\times$, or $3\times$ of frequencies corresponding to the target RPM). Those harmonics may be used to estimate the RPM.

The memory 330 may include storage media such as RAM, SD card 332, or external flash memories 334. The sensed machine information of machine characteristics, physical or statistical features (including RPM estimates), intermediate data processing such as the statistical or physical features, fault detection, fault diagnostics, or estimated time of machine failure since the detected fault, may be stored in the memory 330. In some examples, the time-stamps registered for the collected sensor data may also be stored in the memory 330. The machine sensor data may be stored at specified data rate. In an example, the memory 330 may store 1-sec continuous machine sensor data within a 1-min interval.

In various examples, the memory 330 may store a machine operational state model, also referred to as an "ON/OFF model". The edge nodes can use the model to determine whether a machine or a machine part being monitored is in an ON or an OFF state. The ON/OFF model may be created and maintained in the cloud 130. The microprocessor 320 may apply the ON/OFF model to the information of machine characteristics, or summary statistics obtained therefrom. If the machine or machine part is determined to be in an ON state, then the microprocessor 320 may perform feature extraction, RPM estimates, among other node-level analysis.

The transceiver 340 may include a circuit that produces electromagnetic waves to transmit and receive data. The transceiver 340 includes a connector for connecting an antenna. In an example as illustrated in FIG. 3, the transceiver 340 includes a universal asynchronous receiver-transmitter (UART) 342 for asynchronous serial communication in which the data format and transmission speeds are configurable. In some examples, the transceiver 340 may be excluded from the system edge node 300, and the receive data may be transmitted to a data repository via wired connection.

The microprocessor 320 may additionally perform edge node self-test. In an example, the edge note self-test may include a sensor over range test. In another example, the edge node self-test may include hardware integrity test to ensure proper operational status of individual edge nodes and communication within the wireless sensor network. The microprocessor 320 may switch between an edge-node self-test mode and a data acquisition and processing mode, either automatically or triggered by a user command.

Figure 4:
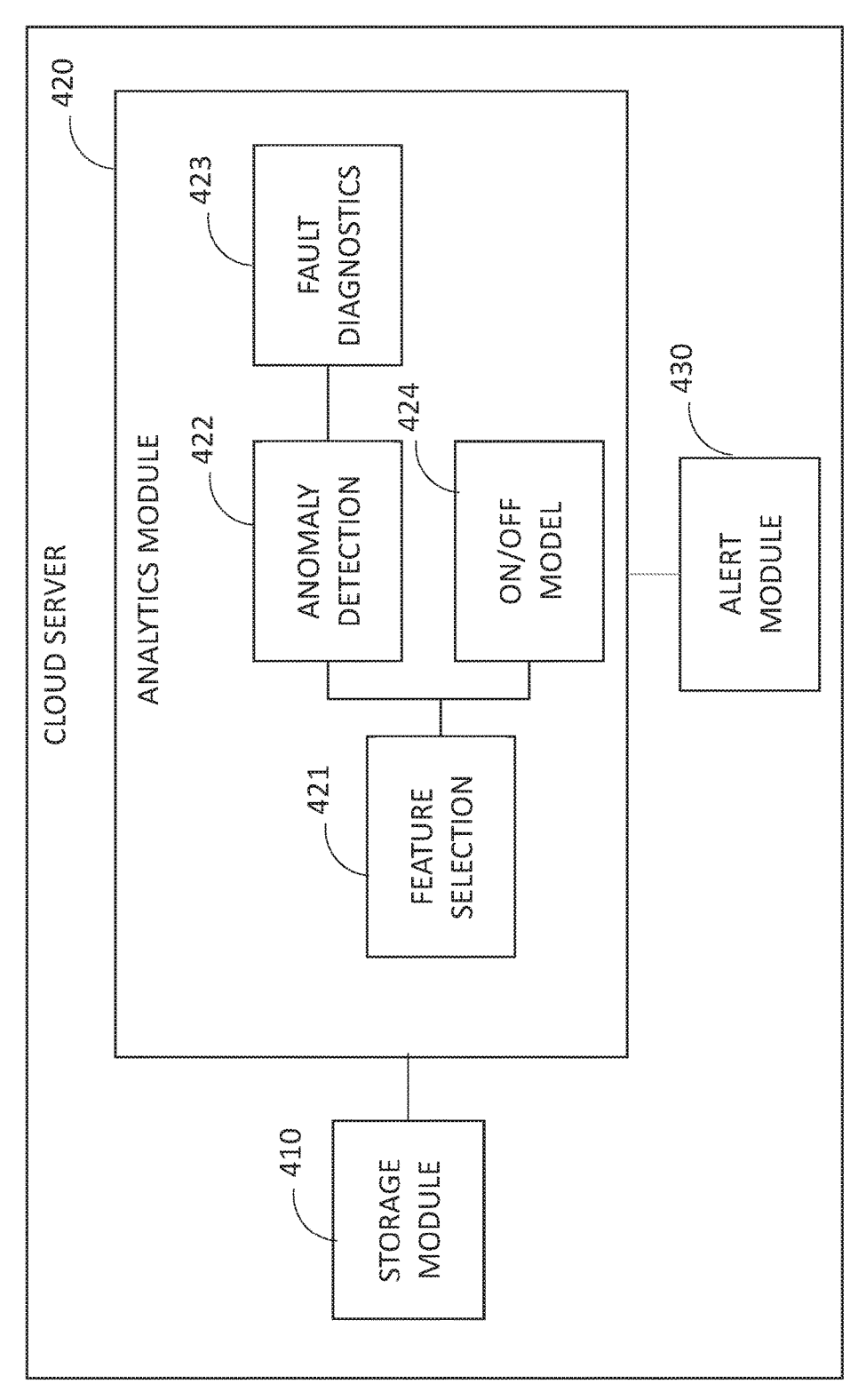
FIG. 4 is a block diagram illustrating, by way of example, portions of functional modules for machine fault analysis in a cloud server.

FIG. 4 is a block diagram illustrating, by way of example, portions of functional modules for machine fault analysis in a cloud server 400. The cloud server, which is an embodiment of the computing device 130 as illustrated in FIG. 1, can be a physical or virtual infrastructure for cloud computing. In an example, the cloud service 400 can be configured to provide cloud-based services, such as application- and information-processing and data storage. As illustrated in FIG. 4, the computing device 400 can include a storage unit 410, an analytics module 420, and an alert module 430. In an example, said modules may be implemented in separate multiple virtual servers, such as divided from a physical server using virtualization software. A user may securely access the cloud server 400 remotely through an online interface, and process intensive computing and store large volumes of information.

The storage module 410 may be configured to store information received from the edge nodes 110 (e.g., through the gateways 120), including physical and statistical features generated from the sensor information. The storage module 410 may additionally store processing results provided by the analytics module 420, including machine fault detection and diagnostics.

The analytics module 420 can include hardware and software configured to execute a broad suite of algorithms for continuous monitoring and condition-based maintenance (CBM) of the machine or machine parts. Conventional machine health monitoring and maintenance, such as corrective or reactive maintenance, can have severe performance cost. For example, preventive or scheduled maintenance replaces machine parts before the end of their useful life, thereby increasing the operating cost to the facility. In contrast, CBM services actively manage the health condition of the machines being monitored, as well as status of other assets such as the edge nodes 110 and monitoring equipment, in order to perform maintenance only when it is needed and at the most opportune times. CBM optimizes the tradeoff between maintenance costs and performance costs by increasing availability and reliability while eliminating unnecessary maintenance activities. As a result, increased safety of assets and system reliability and availability, and reduced maintenance cost and inventories can be achieved.

The analytics module 420 may execute the CBM algorithms to provide computing services including, by way of example and not limitation, feature selection 421, anomaly detection 422, fault diagnostics 423, and generation and update of machine ON/OFF model 424, among others. The feature selection 421 includes selecting one or more features from the physical and statistical features received from the edge nodes 110. The selection may be based on the type of fault to be detected. In some examples, unsupervised learning methods may be used to select features. Examples of the unsupervised learning methods may include k-means clustering, mixture-of-model based clustering, neural networks, Bayes belief network, principal component analysis, independent component analysis, singular value decomposition, among others.

The anomaly detection 422 refers to services of detecting existence of machine fault. In an example, the machine fault can be detected using RPM readings, such as derived from the information of machine characteristics and provided by the edge nodes 110. A machine fault is detected if the RPM reading deviates from a pre-determined normal RPM value exceeding a specific margin, or falls outside a value range. In another example, the machine fault can be detected using spectral features at characteristic frequencies, such as using the Fast Fourier Transform (FFT). Examples of the FFT features may include magnitude, phase, harmonics, sidebands, beat frequency, bearing fault frequency and so on. Presence of spectral contents different from pre-determined normal spectra, or in other distinct frequencies, may be indicative of machine faults.

Additionally or alternatively, the machine fault can be detected using statistical methods, such as generating a statistical distribution of a temporal or spectral feature. The statistical distribution may involve a probability density function (pdf) of a feature, which may follow a known statistical distribution, such as a Gaussian distribution (also known as normal distribution). A machine fault can be detected using a Gaussian detector. For example, if the pdf of the extracted feature deviates from the Gaussian distribution by a specified margin, a machine fault is deemed to be present. In some examples, statistical distributions (e.g., pdf's) of multiple physical or statistical features may be combined to form a composite metric, such as a combination of deviations of the pdf's of the multiple features from their respective Gaussian distributions. A machine fault can be detected if the composite metric satisfies a specific condition, such as exceeding a threshold.

In another example, the machine fault can be detected using time-frequency analysis, such as by detecting harmonic contents in a time-frequency distribution of the sensor data collected from the machine or machine part. Sensor signals, such as vibration, magnetic, temperature, or acoustic signals produced by a rotating machine, and features derived therefrom (e.g., rotational speed or RPM), are generally time varying in nature, such that the frequency contents therein may vary over time. Examples of the time-frequency analysis methods may include a short-term Fourier transform (STFT), Gabor transform, Gabor spectrogram, among other linear or quadratic time-frequency transform methods. Patterns of frequency changes over time may be determined from the time-frequency presentation of one or more features, and machine fault can be detected using such patterns of frequency changes.

In addition to or in lieu of the foregoing machine fault detection methods, other anomaly detection algorithms may include, by way of example and not limitation, wavelet transform, Wigner-Ville distribution (WVD), cepstrum, bispectrum, correlation method, high-resolution spectral analysis, feature morphological analysis, among others. In some examples, the anomaly detection 422 may involve trending over time a statistical or physical feature, a health indicator, or a diagnostic feature. A characteristic change in the trend, such as a sharp increase (e.g., a slope of the trend exceeding a threshold value), may indicate occurrence of a machine fault. In some examples, such changes in the trend of a feature or health indicator may be used to generate prognostics that predict a likelihood of future machine fault.

The fault diagnostics 423 may include fault isolation, which includes identifying the source of the detected fault as being a specific machine, a subsystem, or a machine component. The fault diagnostics 423 may include classification of fault types, such as bearing fault, shaft fault (different speed), mounting error, gear box fault (losing teeth). In some examples, one or more fault templates may be generated and stored in the storage module 410. Each fault template contains signatures of a corresponding fault type. In an example, the fault template may include a statistical distribution template representing statistical distribution of sensor data or of the features extracted therefrom. When an anomaly is detected, the statistical distribution of the data associated with the detected anomaly may be compared to the statistical distribution templates, and a particular fault type is recognized if the statistical distribution of the data matches the template corresponding to the particular fault type, according to a specific matching criterion (e.g., a matching score exceeding a threshold). In an example, the threshold can be updated using a learning algorithm. Examples of various types of bearing faults are discussed below, such as with reference to FIGS. 6A-6B. In some examples, the analytics module 420 may additionally generate machine prognostics, such as an indicator of estimated remaining useful lifetime of a machine component before a machine failure can happen, based on past and future operational profiles, and frequency, severity, and type of the faults in connection with said machine component.

Figure 5:
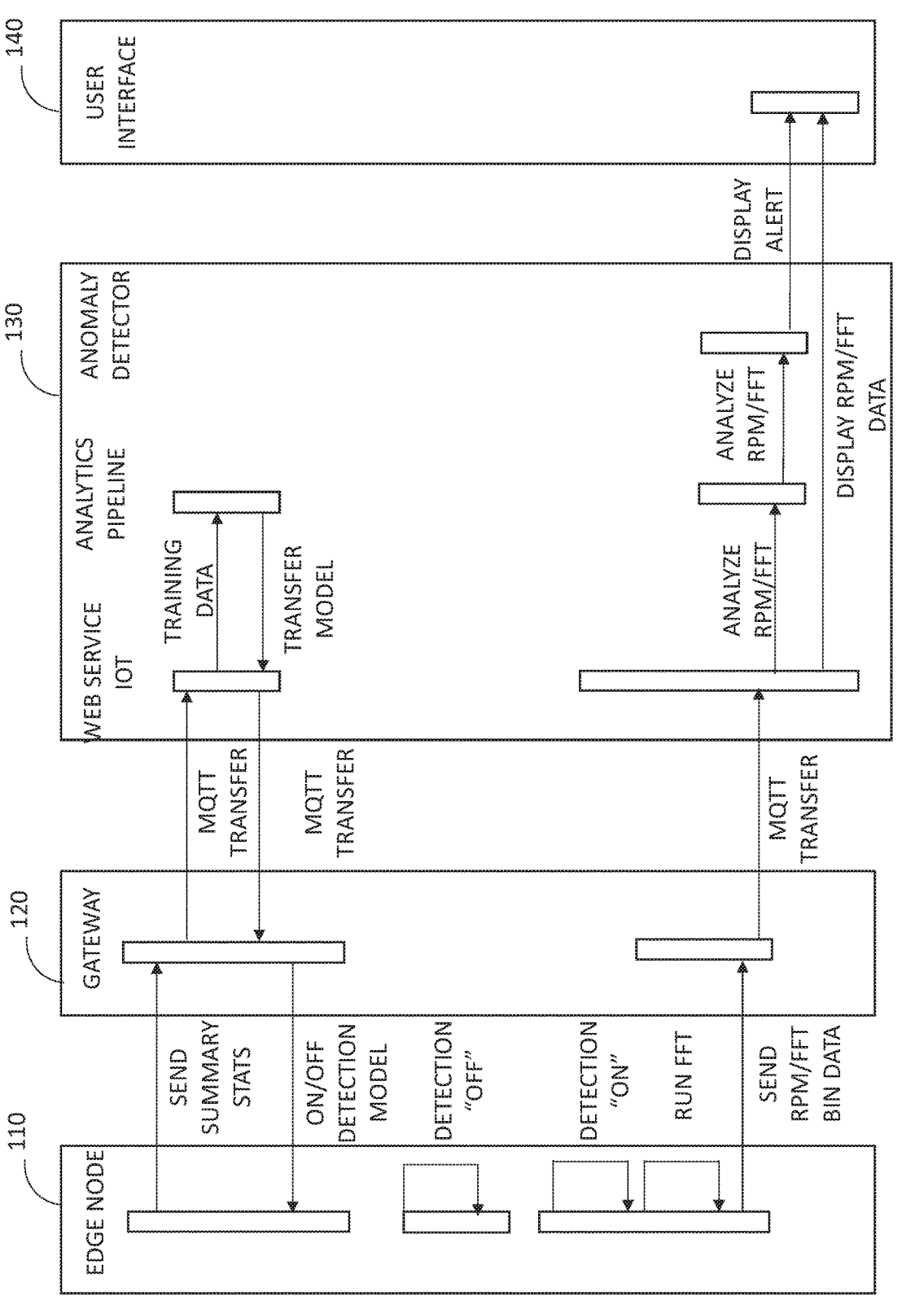
FIG. 5 is a diagram illustrating an event sequence of generating and using an ON/OFF model to detect a machine's operational state.

The ON/OFF model 424 can be generated in the cloud server 400, and used by individual edge nodes to determine an operational state (e.g., ON or OFF state) of the machine or machine part being monitored. In a multi-machine environment, or in a multi-component machine, some machine or machine parts are on and some are off. Information of machine characteristics that is collected by the wireless sensor network (e.g., edge nodes 110) is a mixture of sensor data from multiple machines or machine parts. The ON/OFF model 424 may be downloaded to edge nodes, automatically or upon user command, to identify the machine or machine parts that are "ON". The analytics module 420 may gate certain analytics services such as anomaly detection and diagnostics according to the machine's operational state, such that said services are available only if the machine or the machine part is in an ON state. The ON/OFF state detection can help increase the efficiency of service usage, conserve cloud computing and storage resources, save communication bandwidth, reduce power consumption, and therefore achieve overall cost reduction. FIG. 5 provides an example of operational state-gated services using an ON/OFF model, as to be discussed below.

The alert module 430 may generate alert notification to the user. In some examples, the alert module 430 may include supervisory reasoning algorithms that reconcile conflicting information and provide recommendations such as inspections, repairs, parts ordering, or equipment shutdown. In some examples, the alert module 430 may be implemented in a client device, such as a user interface 140, configured to securely access the cloud server 400 via Internet.

In addition to the alert services and the associated analytics engine and tools, the cloud server 400 may provide other CBM services including, by way of example and not limitation, connectivity, identify, portal application programming interface (API), historian API, customer portal, SOS services, self-help support, flight and deployment service, data warehouse, data visualization, billing, telemetry and monitoring, service dashboard, push notification, system and algorithm updates, among other.

FIG. 5 is a diagram illustrating an event sequence of generating and using an ON/OFF model to detect a machine's operational state. The ON/OFF model may be generated and reside in cloud 130 (or the cloud server 400 as shown in FIG. 4). A cloud-based machine fault monitoring system, such as the machine health monitoring system 100, may detect an ON/OFF state of a machine or machine part, such as a motor, a gearbox, or a bearing. The ON/OFF model may be created using information of machine characteristics, or summary statistics produced by the edge nodes 110. The ON/OFF model may include a statistical model, and may be generated and trained at the cloud. In an example, the ON/OFF model may use a clustering technique to identify the distinct ON and OFF states of operation. This can be performed on a number of features over a number of measurements to generate an aggregate decision of the machine's On or OFF state. In some examples, historical sensor data of a machine may be used to create the ON/OFF model. The ON/OFF model may be stored in the cloud and is accessible by a client device. The ON/OFF model can be updated periodically at specific time or periodicity, or in a command mode such as initiated by a user request.

The ON/OFF model may be provided to the edge nodes 110 automatically or upon a user request. The edge nodes 110 may use the ON/OFF model to identify the machine or machine part that is either "ON" or "OFF". In an example, the ON/OFF model includes a comparison of a motion sensor output (such as from the motion sensor 316) to a threshold. If the node is decided to be in an ON state, sensor data acquisition, feature extraction, RPM estimates, among other node-level analysis, may be carried out on the ON node. The extracted features, among other information, may be transmitted to the cloud 130 via the gateways 120. The analytics services may be used to process the features and to detect anomaly and generate fault diagnostics. A user may securely access the cloud 130 remotely through an online interface, and the fault analytics, among other information, may be displayed on a user interface.

Figure 6A:
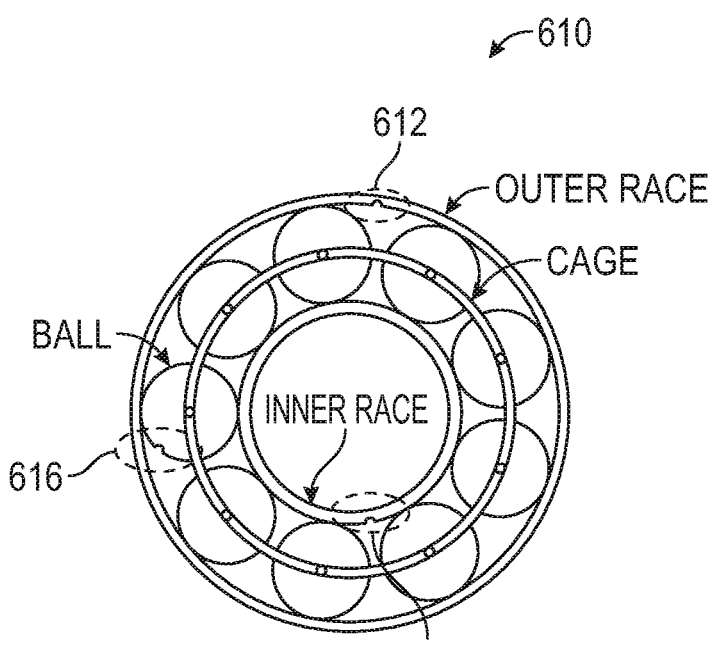
FIGS. 6A-6B illustrate examples of bearing faults and FFT-based bearing fault diagnostics.
Figure 6B:
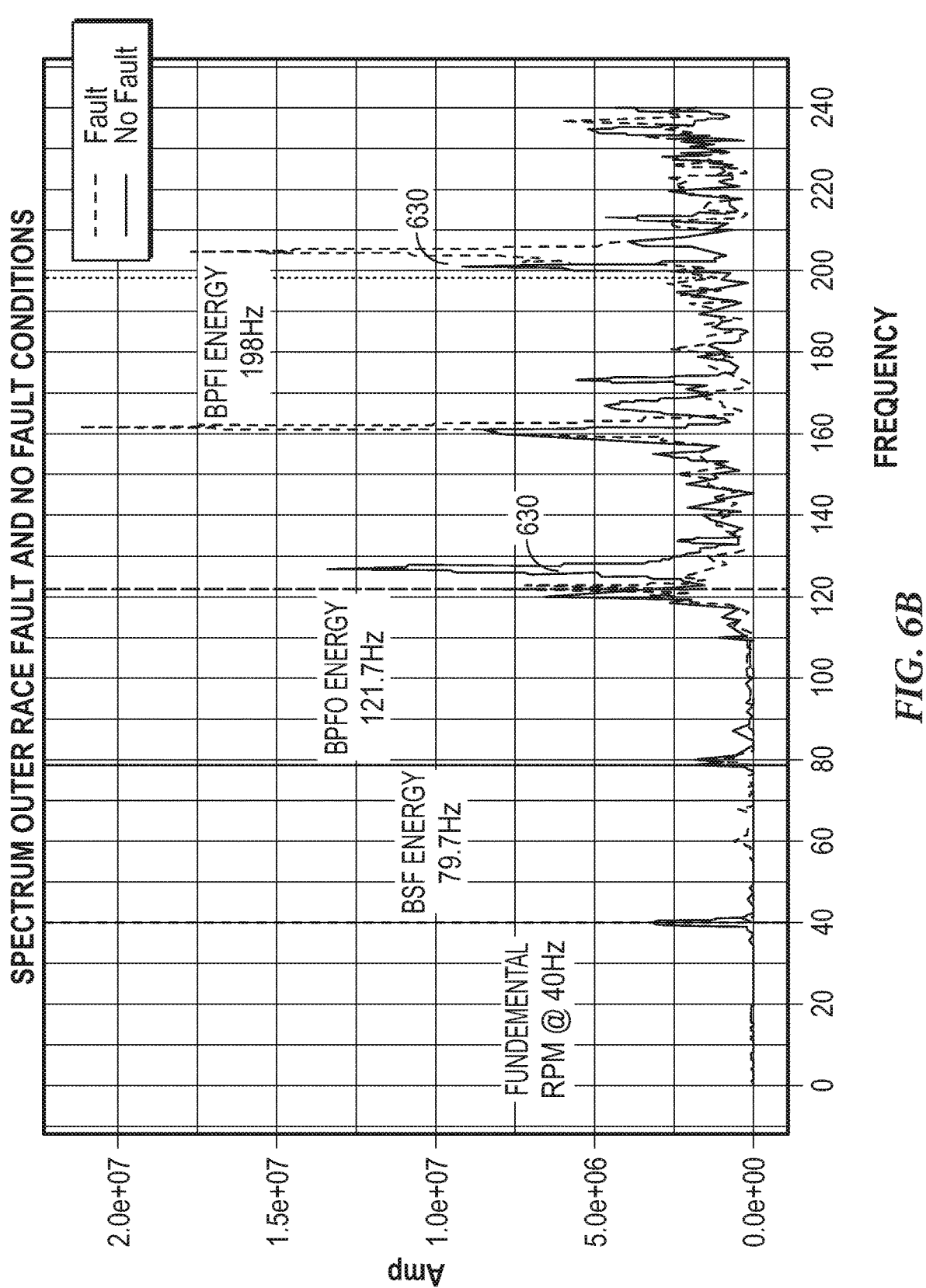

FIGS. 6A-6B illustrate examples of bearing faults and FFT-based bearing fault diagnostics. The fault diagnostics may be generated by the analytics module 420 of the cloud server 400. The bearing fault diagnostics identify an original cause of a bearing fault, such as detected by the anomaly detection 422. Proper diagnostics may be helpful for precision maintenance purposes and remedies of the detected fault. FIG. 6A illustrates different types of bearing faults representing fault locations or damaged components of a ball bearing 610, which may include, by way of example and not limitation, an outer race fault 612 on the outer race of the bearing, an inner race fault 614 on the inner race of the bearing, a ball fault 612 on one of a set of balls, or a combination of two or more of said faults. Additionally or alternatively, the fault diagnostics may identify fault nature, such as cracking or corrosion of components (e.g., a ball), dirt, insufficient lubrication, misalignment, misassembly, or overloading. FIG. 6B is a graph illustrating an FFT spectrum 620 of the outer race of the ball bearing 610. For comparison, an FFT spectrum 610 of a fault-free ball bearing 630 (hereinafter referred to as "normal FFT spectrum") is also shown. One or more characteristic frequencies may be pre-determined, including fundamental operational frequency at 40 Hz (which corresponding to 2400 RPM during the ball bearing 610's normal working condition), and a number of fundamental defect frequencies representing different fault locations on a bearing. The fundamental defect frequencies may be dependent on design specification of a particular bearing, and can be pre-determined using dimensional and operating parameters including ball diameter, pitch diameter, shaft speed, number of rolling elements (e.g., balls), and bearing contact angle which is the angle of load from the radial plane. The bearing frequency multipliers provide a theoretical estimate of the frequency to be expected when the bearing elements defect takes place. By way of example and not limitation, the fundamental defect frequencies may include fundamental train frequency (FTF) of approximately 15.1 Hz, ball spin frequency (BSF) of approximately 79.7 Hz, ball pass frequency of outer ring (BPFO) of approximately 121.7 Hz, and ball pass frequency of inner ring (BPFI) of approximately 198 Hz.

When the balls hit local faults at outer or inner races, or when faults on the balls hit the outer or inner races, the impact will modulate the corresponding critical frequencies, such as FTF, BSF, BPFO, and BPFI. As illustrated in FIG. 6B, the FFT spectrum 620 has substantially higher spectral magnitude at or around the BPFI, and substantially lower spectral magnitude at or around BPFO. The analytics module 420 may diagnose the bearing fault to be outer race fault based on a comparison of one or more of spectral magnitude at the BPFI or BPFO to their respective thresholds, or based on a comparison of one or more of spectral magnitude at the BPFI or BPFO to the spectral magnitude on the normal FFT spectrum at the corresponding fundamental fault frequencies. The FFT-based bearing fault diagnostics as discussed herein may be similarly applied to detect and characterize other machine faults such as, by way of example and not limitation, alignment, shaft, lubricant and other faults with identifiable characteristics.

Figure 7:
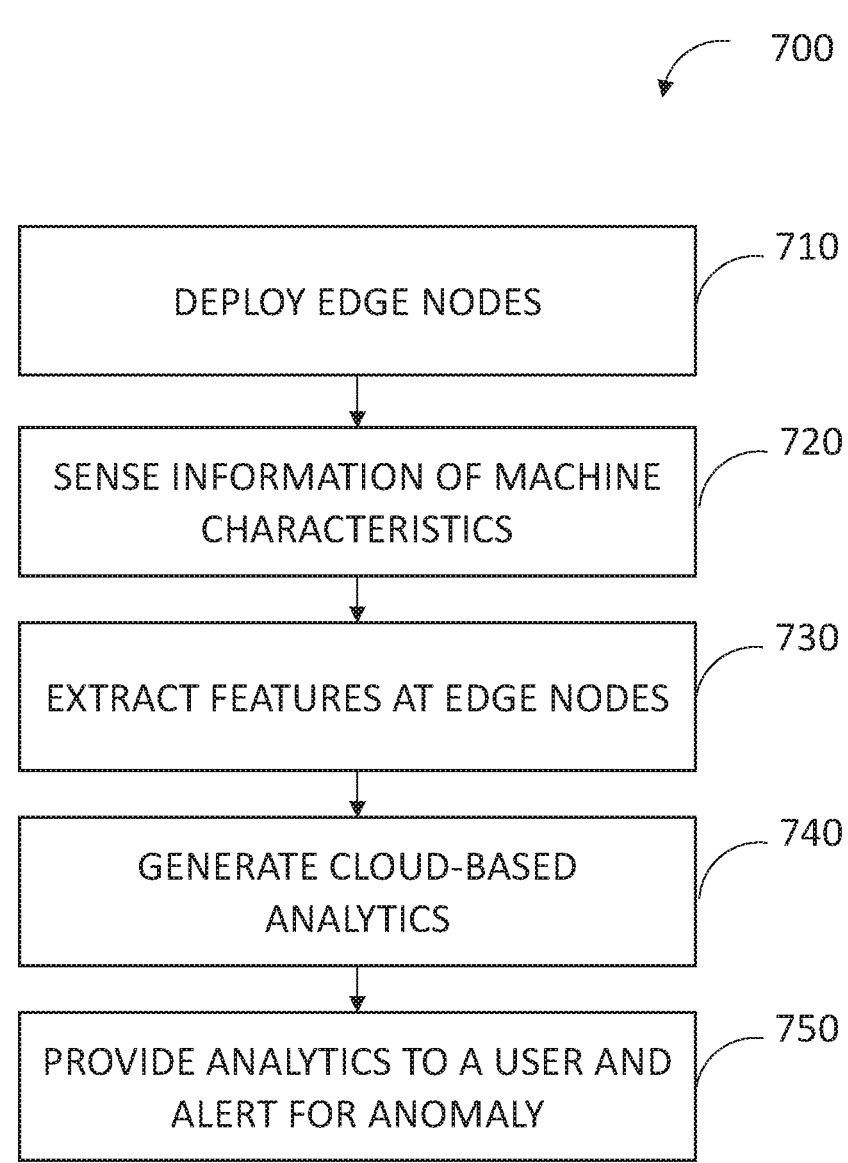
FIG. 7 is a flow-chart illustrating an exemplary method of condition-based monitoring of machine health status using cloud services.

FIG. 7 is a flow-chart illustrating an exemplary method 700 of condition-based monitoring of machine health status using cloud services, including machine fault detection and diagnosis. The method 700 may be implemented in and executed by a machine health monitoring system, such as the system 100 as discussed above.

The method 700 commences at 710, where multiple edge nodes, such as the edge nodes 110, may be deployed to machines or machine parts. In an example, an edge node may be mounted on a machine or a machine part invasively or non-invasively. Non-invasive mounting means may include magnetic, epoxy, or various adhesives, among others. An example of an edge node, including its profile and structural components, is illustrated in FIGS. 2A-2B. The edge nodes may be inter-communicated and synchronized to form a wireless sensor network.

At 720, information of machine characteristics may be monitored using the one or more edge nodes. The edge nodes may each include one or more sensor types configured to sense machine characteristics such as vibration, energy profiles, magnetic field, temperature, or acoustic information produced by the rotational movement of machine components. In an example, the sensor nodes each include accelerometers configured to sense vibration information, and a data acquisition system to acquire the sensor data. In an example, the edge nodes may be mounted at or close to a rotational element of a machine, such as a motor, a gearbox, or a bearing, and the sensor data acquired therefrom may contain information of rotations of the machine parts. At 730, the sensor data may be pre-processed, such as amplification, filtering, and other signal conditioning. Physical and statistical features, health indicators, and diagnostic features can be extracted from the pre-processed sensor data, such as using the microprocessor 320. The features or indicators may be extracted or derived from time-domain analysis, frequency-domain or spectral analysis, joint time-frequency analysis, or analysis in other transformed domain, of the sensor data. In an example, the features extracted at 730 may include an estimate of rotation speed, such as RPM, of a rotating machine. The RPM may be estimated using a FFT spectrum of the sensor data. The extracted features may be stored in an internal memory or an external storage device (e.g., a SD card or an external flash memory) of the edge node.

The extracted features may be transferred to a cloud server for machine fault detection and analysis. The cloud server, such as the cloud 130 or the cloud server 400, can be a computing device configured to provide cloud-based services (storage, analytics, maintenance etc.). In some examples, communication between the edge nodes and the cloud may involve one or more gateways.

At 740, machine analytics may be generated at the cloud using the features produced at and provided by the edge nodes, such as using the analytics module 420 as illustrated in FIG. 4. A feature subset may be selected from the received features, such as via an unsupervised learning process, and machine anomaly may be detected using the selected feature set. The machine fault can be detected using RPM readings, FFT spectral features at characteristic frequencies, a statistical distribution of a temporal or spectral feature, time-frequency analysis, among others. The detected fault may further be classified into one of fault type, such as bearing fault, shaft fault (different speed), mounting error, and gearbox fault (losing teeth). In an example, fault classification may involve comparing the extracted feature, or a statistical distribution of the extracted feature, to a template contains signatures of a corresponding fault type.

At 750, fault detection and diagnostics may be provided to a user. The user may access the data and services in the cloud via one or more locally configured clients or remote clients that are securely connected to the cloud, such as PCs, tablets, mobile phones or other mobile devices in communication with the cloud via Internet connection. In an example, fault analytics (e.g., detection, diagnostics, or prognostics) may be displayed on a user interface (e.g., a display screen) in a form of interactive dashboard. In some examples, alert notification may be generated and sent to the user. Upon alert notification, the user may view that status, interpret the results, and take actions such as performing further test, make necessary repairs or other preventive or corrective actions.

Figure 8:
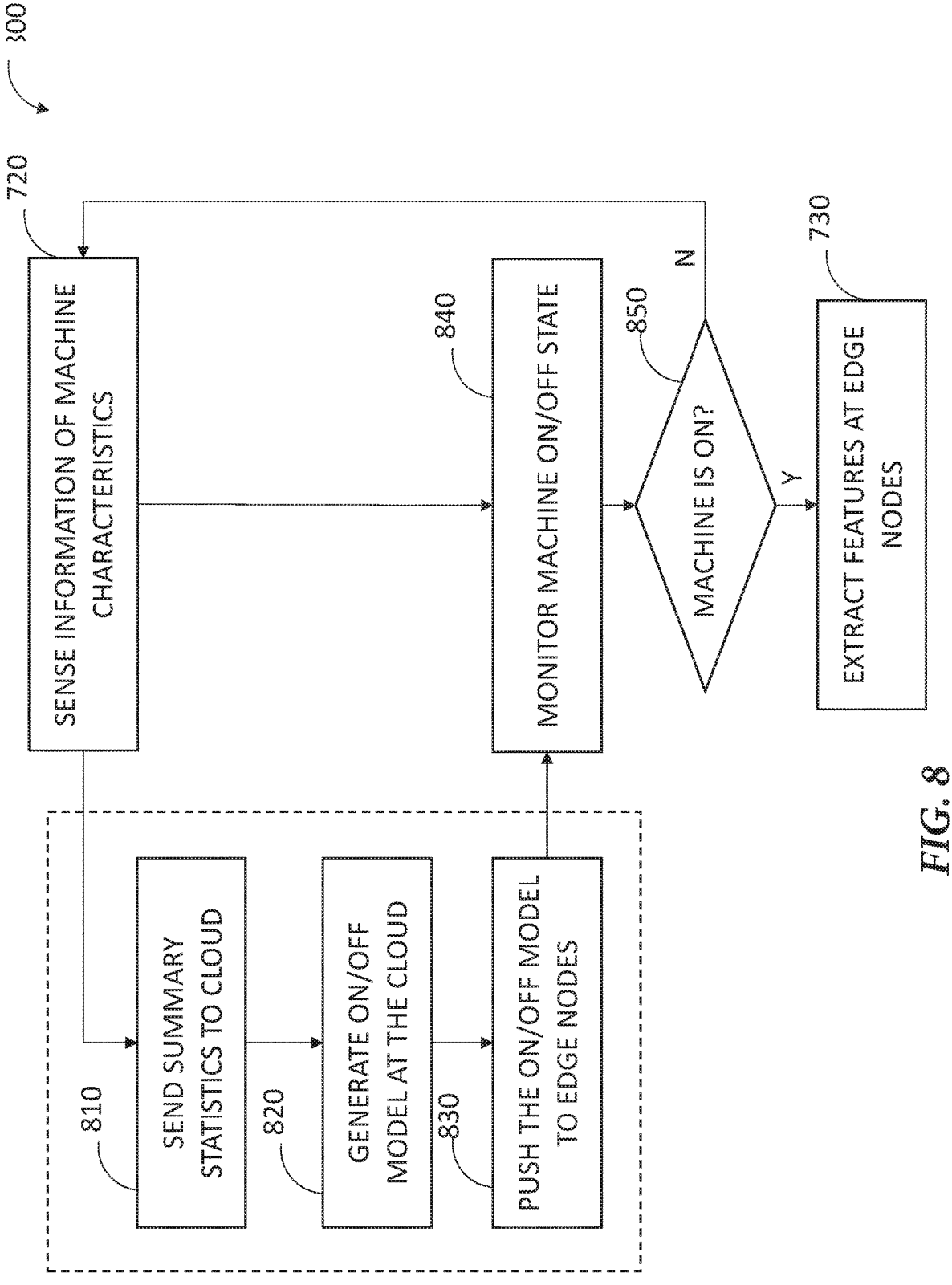
FIG. 8 is a block diagram illustrating portions of a method for generating and using an ON/OFF model in machine health status monitoring.

FIG. 8 is a block diagram illustration portions of a method 800 for generating and using an ON/OFF model in machine health status monitoring. The illustrated portions include steps for creating an ON/OFF model using cloud services, and using that ON/OFF model to detect machine operational state at the edge nodes. The illustrated method portion 800 can be incorporated into the algorithm 700 as discussed above, such as between the steps 720 and 730.

In accordance with the method 800, information of machine characteristics (e.g., vibration information, among other sensor data) may be sensed at the edge nodes at 720, as discussed above with reference to FIG. 7. At 810, summary statistics, including RPM estimates, may be generated using the information of machine characteristics, and sent to the cloud. There, cloud service can be utilized to create an ON/OFF model. In an example, the ON/OFF model is a statistical model. In some examples, machine characteristics and summary statistics used for creating the ON/OFF model may be obtained from historical sensor data. The model can be updated periodically at specific time or periodicity, or in a command mode such as initiated by a user request. The ON/OFF model may be stored in the cloud and is accessible by a client device. At 830, the ON/OFF model may be transferred and downloaded to the edge nodes, automatically or upon a user request. At 840, the edge nodes may apply the sensor data (which may not be identical to the historical machine characteristics used for creating or maintaining the ON/OFF model at the cloud) to the ON/OFF model to monitor machine's operational state. If at 850 the edge node determines the machine or machine part being monitored is in an ON state, then, at 730, feature extraction, among various node-level analysis, may be carried out on that edge node. The extracted features can then be transmitted to the cloud where machine anomaly and fault diagnostics may be generated, as discussed above with reference to FIG. 7. However, if at 850 the edge node determines the machine or machine part being monitored is in an OFF state, then, further sensor data may be sensed at 720 and machine operational state may be monitored using the sensed sensor data. Additionally or alternatively, the ON/OFF state may be checked using an updated ON/OFF model if one has been created and made available the edge nodes.

Figure 9:
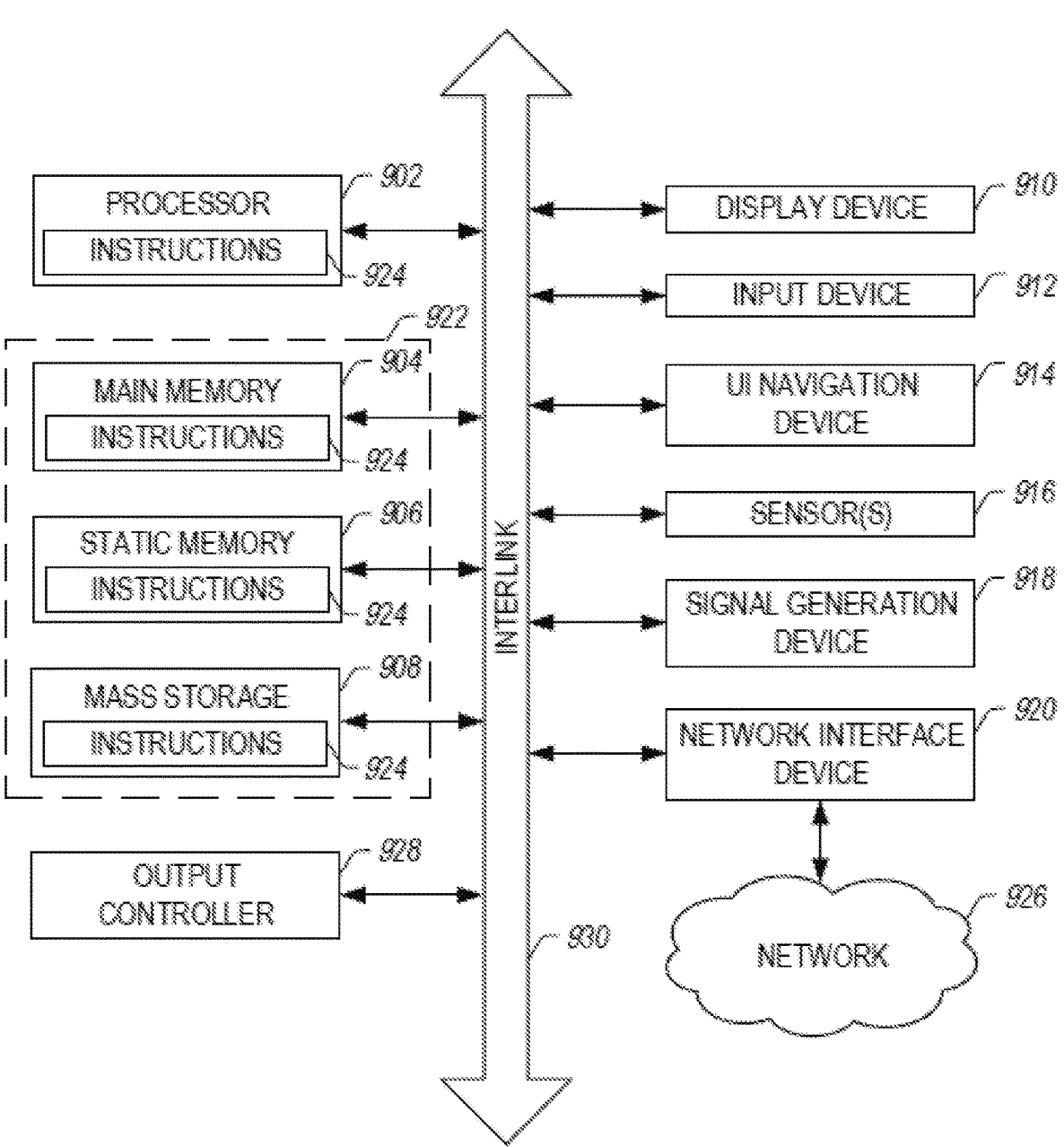
FIG. 9 illustrates generally a block diagram of an example machine upon which any one or more of the techniques (e.g., methodologies) discussed herein may perform.

FIG. 9 illustrates a block diagram of an example machine 900 upon which any one or more of the techniques (e.g., methodologies) discussed herein may perform. Portions of this description may apply to the computing framework of various portions of the edge nodes or a portion of the cloud server.

Examples, as described herein, may include, or may operate by, logic or a number of components, or mechanisms in the machine 900. Circuitry (e.g., processing circuitry) is a collection of circuits implemented in tangible entities of the machine 900 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 900 follow.

In alternative embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 900 may include a hardware processor 902 (e.g., a central processing unit (CPU), a graphics processing unit (GPU), a hardware processor core, or any combination thereof), a main memory 904, a static memory (e.g., memory or storage for firmware, microcode, a basic-input-output (BIOS), unified extensible firmware interface (UEFI), etc.) 906, and mass storage 908 (e.g., hard drive, tape drive, flash storage, or other block devices) some or all of which may communicate with each other via an interlink (e.g., bus) 930. The machine 900 may further include a display unit 910, an alphanumeric input device 912 (e.g., a keyboard), and a user interface (UI) navigation device 914 (e.g., a mouse). In an example, the display unit 910, input device 912, and UI navigation device 914 may be a touch screen display. The machine 900 may additionally include a signal generation device 918 (e.g., a speaker), a network interface device 920, and one or more sensors 916, such as a global positioning system (GPS) sensor, compass, accelerometer, or one or more other sensors. The machine 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 902, the main memory 904, the static memory 906, or the mass storage 908 may be, or include, a machine-readable medium 922 on which is stored one or more sets of data structures or instructions 924 (e.g., software) embodying or utilized by any one or more of the techniques or functions described herein. The instructions 924 may also reside, completely or at least partially, within any of registers of the processor 902, the main memory 904, the static memory 906, or the mass storage 908 during execution thereof by the machine 900. In an example, one or any combination of the hardware processor 902, the main memory 904, the static memory 906, or the mass storage 908 may constitute the machine-readable medium 922. While the machine-readable medium 922 is illustrated as a single medium, the term "machine-readable medium" may include a single medium or multiple media (e.g., a centralized or distributed database, and/or associated caches and servers) configured to store the one or more instructions 924.

The term "machine-readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine-readable medium examples may include solid-state memories, optical media, magnetic media, and signals (e.g., radio frequency signals, other photon based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine-readable media that do not include transitory propagating signals. Specific examples of non-transitory machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 may be further transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 900, and includes digital or analog communications signals or other intangible medium to facilitate communication of such software. A transmission medium is a machine-readable medium.

Various embodiments are illustrated in the figures above. One or more features from one or more of these embodiments may be combined to form other embodiments. The method examples described herein can be machine or computer-implemented at least in part. Some examples may include a computer-readable medium or machine-readable medium encoded with instructions operable to configure an electronic device or system to perform methods as described in the above examples. An implementation of such methods may include code, such as microcode, assembly language code, a higher-level language code, or the like. Such code may include computer readable instructions for performing various methods. The code can form portions of computer program products. Further, the code can be tangibly stored on one or more volatile or non-volatile computer-readable media during execution or at other times.

The above detailed description is intended to be illustrative, and not restrictive. The scope of the disclosure should, therefore, be determined with references to the appended claims, along with the full scope of equivalents to which such claims are entitled.

The invention claimed is:

1. A system for monitoring machine health condition, the system comprising:
a sensor network including sensor nodes configured to sense information of machine characteristics respectively from a plurality of machine parts, the sensor nodes each including:
a first sensor module configured to acquire first machine data, and based thereon to detect an ON state of a machine part indicating execution of an intended operation, or an OFF state of the machine part indicating non-execution of the intended operation, using a trained machine operational state model; and
a second sensor module, differing from the first sensor module in at least one of sensing modality or performance characteristic, configured to acquire second machine data, and based thereon to generate one or more features, including spectral contents at one or more predetermined frequencies or frequency ranges corresponding to respective one or more fault types;
a cloud-computing device, communicatively coupled to the sensor network, configured to:
generate the trained machine operational state model using a clustering algorithm and historical sensor data collected from the plurality of machine parts; and
query a state of a portion of the plurality of machine parts and, conditional upon the queried state, provide one or more cloud-based services to the portion of the plurality of machine parts for detecting an existence of a fault or diagnosing a fault type thereof using the generated one or more features including the spectral contents at the one or more predetermined frequencies or frequency ranges corresponding to the respective one or more fault types, such that the cloud-based services of fault detection or fault type diagnosis are provided when the portion of the plurality of machine parts are in the ON state and not provided when the portion of the plurality of machine parts are in the OFF state; and
a user interface configured to alert a user of the detected fault or the diagnosed fault type.

2. The system of claim 1, wherein the cloud-computing device is configured to train the machine operational state model using a clustering algorithm and historical sensor data collected from the plurality of machine parts, and
wherein the sensor nodes are each configured to generate and transmit the one or more features to the cloud-computing device only if the respective machine parts are determined to be in an ON state.

3. The system of claim 1, wherein at least one of the sensor nodes is configured to estimate an operating speed of a machine part using the sensed information of machine characteristics, and wherein the cloud-computing device is configured to detect the existence of the fault or to diagnose the fault type of the portion of the plurality of machine parts using the estimated operating speed of the machine part.

4. The system of claim 1, wherein the spectral contents include spectral peak magnitudes at the one or more predetermined frequencies or frequency ranges, wherein the cloud-computing device is configured to detect the existence of the fault or to diagnose the fault type based on a comparison of the spectral peak magnitudes to respective spectral magnitude thresholds or respective reference spectral magnitudes determined for fault-free machine parts.

5. The system of claim 1, wherein the one or more cloud-based services includes generating an indicator of time to machine failure since the detected existence of the fault using the generated one or more features.

6. The system of claim 1, wherein the cloud-computing device is configured to diagnose the fault type using one or more fault templates each including a temporal, spectral, or statistical characteristic of a corresponding machine fault.

7. The system of claim 1, wherein the sensor nodes include magnetic sensors configured to sense magnetic field information respectively produced by the plurality of machine parts.

8. The system of claim 1, wherein the sensor nodes include temperature sensors configured to sense temperature information respectively from the plurality of machine parts.

9. The system of claim 1, wherein the sensor nodes include acoustic sensors configured to sense acoustic information respectively from the plurality of machine parts.

10. The system of claim 1, wherein the sensor nodes are configured to be affixed to the respective machine parts using a non-invasive mounting means.

11. The system of claim 1, comprising a client device associated with the user interface, the client device configured to:

communicate with the cloud-computing device to access the one or more cloud-based services; and display on the user interface an interactive dashboard including the detected fault or the diagnosed fault type.

12. The system of claim 11, wherein the client device include a mobile device.

13. The system of claim 1, wherein the first sensor module includes a first accelerometer having a first bandwidth, and the second sensor module includes a second accelerometer having a second bandwidth higher than the first bandwidth.

14. A method for monitoring machine health condition, the method comprising:

sensing information of machine characteristics of a plurality of machine parts using networked sensor nodes respectively deployed to the plurality of machine parts, the networked sensor nodes each including a first sensor module configured to acquire first machine data and a second sensor module configured to acquire second machine data, the second sensor module differing from the first sensor module in at least one of sensing modality or performance characteristic;

training a machine operational state model for the sensor nodes using a clustering algorithm and historical sensor data collected from the plurality of machine parts;

based on the first machine data, detecting an ON state of a machine part indicating execution of an intended operation, or an OFF state of the machine part indicating non-execution of the intended operation, using the trained machine operational state model;

based on the second machine data, generating one or more features, including spectral contents at one or more predetermined frequencies or frequency ranges corresponding to respective one or more fault types;

via a cloud-computing device, querying a state of a portion of the plurality of machine parts and, conditional upon the queried state, providing one or more cloud-based services to the portion of the plurality of machine parts and generating cloud-based analytics including detecting an existence of a fault or diagnosing a fault type thereof using the generated one or more features including the spectral contents at the one or more predetermined frequencies or frequency ranges corresponding to the respective one or more fault types, such that the cloud-based services of fault detection or fault type diagnosis are provided when the portion of the plurality of machine parts are in the ON state and not provided when the portion of the plurality of machine parts are in the OFF state; and alerting a user of the detected fault or the diagnosed fault type.

15. The method of claim 14, comprising:

training the machine operational state model using a clustering algorithm and historical sensor data collected from the plurality of machine parts; and generating and transmitting the one or more features to the cloud-computing device only if the respective machine parts are determined to be in an ON state.

16. The method of claim 14, wherein generating the cloud-based analytics includes generating an indicator of time to a machine failure since the detected existence of the fault using the generated one or more features.

17. The method of claim 14, wherein sensing the information of machine characteristics includes sensing, form the plurality of machine parts, one or more of vibration, magnetic field, temperature, or acoustic information.

18. A non-transitory machine-readable storage medium that includes instructions that, when executed by one or more processors of a machine, cause the machine to perform operations comprising:

receiving information of machine characteristics of a plurality of machine parts sensed by networked sensor nodes deployed to the plurality of machine parts, the networked sensor nodes each including a first sensor module configured to acquire first machine data and a second sensor module configured to acquire second machine data, the second sensor module differing from the first sensor module in at least one of sensing modality or performance characteristic;

based on the first machine data, detecting an ON state of a machine part indicating execution of an intended operation, or an OFF state of the machine part indicating non-execution of the intended operation, using a machine operational state model;

based on the second machine data, generating one or more features, including spectral contents at one or more predetermined frequencies or frequency ranges corresponding to respective one or more fault types;

querying a state of a portion of the plurality of machine parts and, conditional upon the queried state, providing one or more cloud-based services to the portion of the plurality of machine parts and generating cloud-based analytics including detecting an existence of a fault or diagnosing a fault type thereof using the generated one or more features including the spectral contents at the one or more predetermined frequencies or frequency ranges corresponding to the respective one or more fault types, such that the cloud-based services of fault detection or fault type diagnosis are provided when the portion of the plurality of machine parts are in the ON state and not provided when the portion of the plurality of machine parts are in the OFF state; and generating an alert of the detected fault or the diagnosed fault type.

19. The non-transitory machine-readable storage medium of claim 18, wherein the operation of diagnosing the fault type includes using one or more fault templates each including temporal, spectral, or statistical characteristics of a corresponding machine fault.

20. The non-transitory machine-readable storage medium of claim 18, wherein the operations comprise:

accessing one or more of the cloud-based services using a client device; and displaying on a user interface an interactive dashboard including the detected fault or the diagnosed fault.

* * * * *